No. 671,381. Patented Apr. 2, 1901.
W. R. JENKINS.
HOE.
(Application filed Dec. 8, 1899.)
(No Model.)
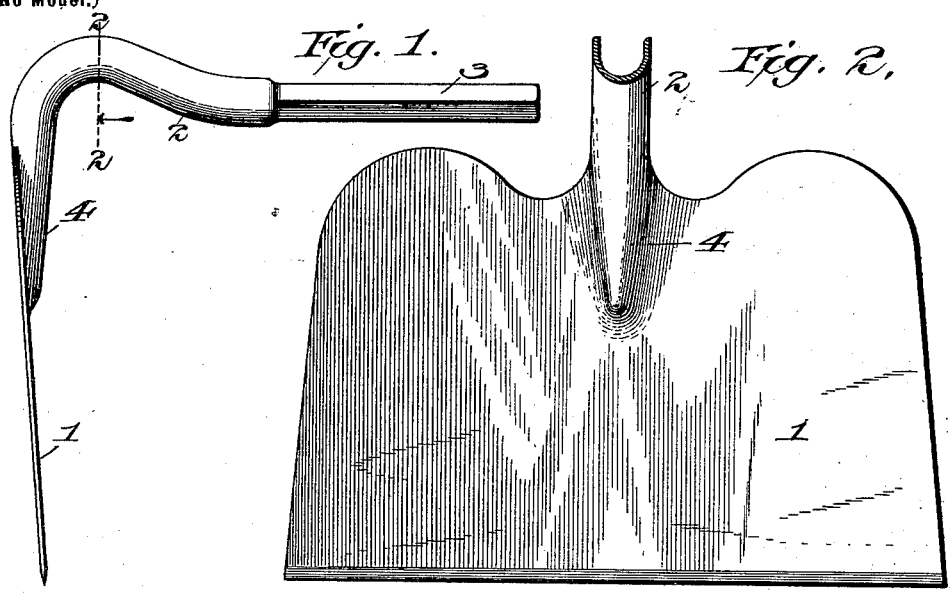
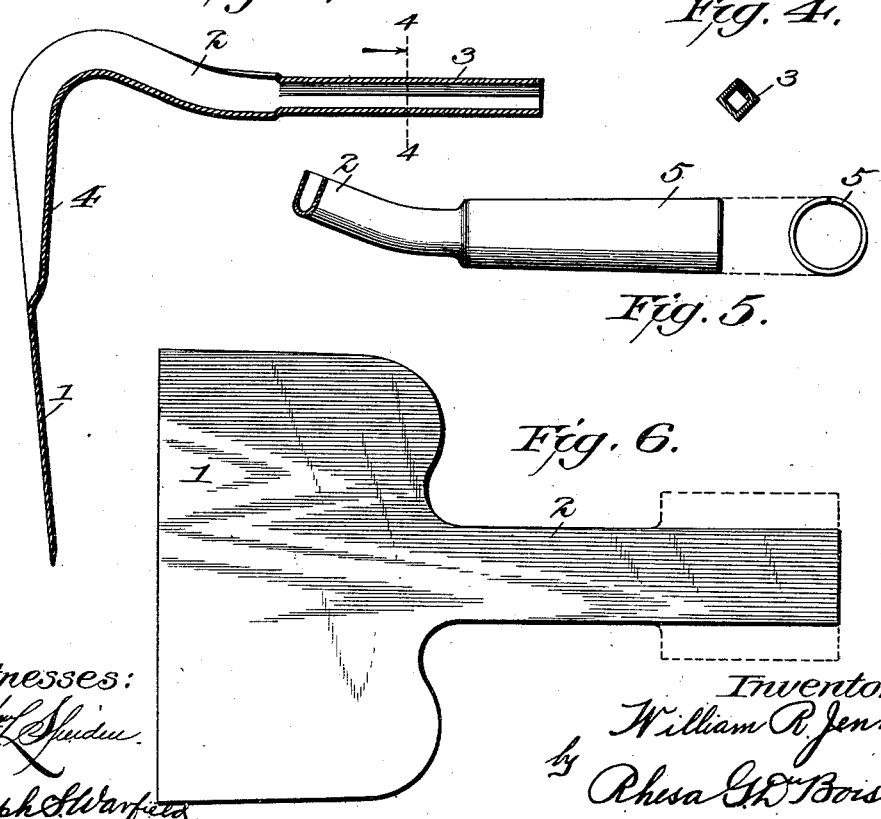

UNITED STATES PATENT OFFICE.

WILLIAM R. JENKINS, OF BELLEFONTE, PENNSYLVANIA.

HOE.

SPECIFICATION forming part of Letters Patent No. 671,381, dated April 2, 1901.

Application filed December 8, 1899. Serial No. 739,728. (No model.)

*To all whom it may concern:*

Be it known that I, WILLIAM R. JENKINS, a citizen of the United States, residing at Bellefonte, in the county of Center and State of Pennsylvania, have invented new and useful Improvements in Hoes, of which the following is a specification.

My invention relates to an improvement in hoes.

Hitherto the usual methods of making hoes have been either to use a blank of sufficient thickness, where a solid hoe was required, to make the shank much thicker than the blade, and then to roll and hammer the blade to the required thickness and forge the shank into shape, and finally trim the blade to proper form, or else it has generally been the practice to cut the blade from sheet metal, making the shank of separate material, and securing them together by means of rivets.

The object of my invention is to make a complete hoe (except the handle of course) from one piece of sheet metal without forging or riveting. Both the blade and shank are stamped from a single piece of sheet metal of the requisite thickness for the finished article to form both the blade and shank, and the shank is bent into gooseneck shape lengthwise and transversely crimped in order to give it the required strength and stiffness, thus requiring no forging, rolling, or plating of the blade, as has been the custom. In other words, the principal point of novelty and merit of my present invention is in the construction of the shank in a sheet of metal of uniform thickness at and near the point where it joins the blade by the V-shaped crimp that joins the shank, thereby producing a hoe formed from thin sheet metal having a shank with the requisite strength and proper shape without forging, riveting, or reinforcing by the use of additional metal, the original sheet from which the blank is cut being of the thickness of the blade and no additional thickness being necessary to form the shank. With these objects in view my invention consists in certain novel features of construction and combinations of parts, which will be hereinafter described, and pointed out in the claims.

In the accompanying drawings, Figure 1 is a view in side elevation. Fig. 2 is a view taken on the line 2 2 of Fig. 1, thus showing the shank in section and the blade in front elevation. Fig. 3 is a vertical sectional view through the longitudinal center of the hoe. Fig. 4 is a transverse section on line 4 4 of Fig. 3. Fig. 5 is a view showing the tang modified to form a socket; and Fig. 6 is a view of the blank from which my improved hoe is struck, the dotted lines indicating its modified outline for the construction indicated in Fig. 5.

The blank is cut from sheet metal of uniform thickness in substantially the shape shown, and it is struck up into shape, the blade portion being indicated by the numeral 1, the shank by 2, and the tang by 3. The blade is of any approved design. The shank is goosenecked in general form, and being of sheet metal and of the same thickness as the blade it is crimped into U shape or the reverse ∩ to give it adequate strength and rigidity at a point where in a hoe the greatest strain always comes. The shank begins to form at the point where it joins the blade, and the blade is stiffened at this point, where the strain comes, by the V-shaped offset 4, which offset may extend up or down, thereby giving an extra amount of strength at this point, which otherwise would be a point of greatest weakness, as is well known to any one accustomed to the use of a hoe. The tang portion 3 is formed by rolling the sheet metal together tightly or to form an open tube, and it is preferably angular in cross-section to give it increased strength and to lessen the liability of its splitting the wooden handle when driven into it.

Instead of rolling the shank into a tang, as described, this portion might be given the form of a socket 5, as shown in the modification, to receive the handle of the hoe.

From the foregoing it will be seen that a light, cheap, and strong commercial article is produced without the necessity of forging, riveting parts together, or reinforcing. The entire article is of uniform thickness, as stated, and it is strengthened at the otherwise weak points by the crimping of the shank and the V-shaped offset where the shank and blade merge into each other.

Having fully described my invention, what I claim as new, and desire to secure by Letters Patent, is—

1. As an article of manufacture, a hoe composed of sheet metal of uniform thickness throughout, constituting a blade and a shank, said shank having a general gooseneck form, a V-shaped offset formed at the point of juncture between the shank and blade which offset extends into the body of the blade in the center and inside face thereof, forming a rib which gives the blade the required strength and stiffness, thereby requiring no forging, riveting or reinforcing, by the use of additional metal.

2. As an article of manufacture, a hoe composed of sheet metal of uniform thickness throughout to form a blade and shank in a single integral piece of metal, the shank joined to the blade in an inwardly-extending V-shaped offset to give strength to the blade at that point and the shank having a goosenecked shape and crimped transversely to give it strength, and rolled together at its end to form a tang for insertion into the tool-handle.

3. As an article of manufacture, a hoe composed of sheet metal of uniform thickness throughout and cut and bent to form a blade and shank, the blade having a V-shaped offset extending transversely through the center from a point near the middle of the blade and continuing into the shank, the shank being U-shaped in transverse section and constituting a continuation of the offset, the shank having a direction approximately in alinement with the blade for some distance after it leaves the latter and then bent approximately at right angles, edgewise thereof and terminating in a rolled tang adapted for attachment to the hoe-handle.

4. As an article of manufacture, a hoe composed of sheet metal of uniform thickness throughout and cut and bent to form a blade and shank, the latter having a general gooseneck form and strengthened by means of a transverse roll in the metal composing it and the blade having a transverse offset formed in its center on the inner surface thereof, as an unbroken continuation of the rolled shank whereby to give strength and rigidity to the blade.

In testimony whereof I affix my signature in presence of two witnesses.

WILLIAM R. JENKINS.

Witnesses:
S. D. GETTIG,
JNO. F. BOWEN.